United States Patent

[11] 3,629,546

| [72] | Inventor | Franklin Hornor Fry<br>Appleton, Wis. |
|---|---|---|
| [21] | Appl. No. | 812,763 |
| [22] | Filed | Apr. 2, 1969 |
| [45] | Patented | Dec. 21, 1971 |
| [73] | Assignee | American Can Company<br>New York, N.Y. |

[54] AIR-COOLED LASER PROCESSING OF MATERIALS
8 Claims, 3 Drawing Figs.

[52] U.S. Cl.............................................. 219/121 L
[51] Int. Cl.............................................. B23k 9/00
[50] Field of Search............................219/121, 70

[56] References Cited
UNITED STATES PATENTS
| 769,581 | 9/1904 | Arnold | 128/396 |
|---|---|---|---|
| 1,823,535 | 9/1931 | Frutkow et al. | 250/88 |
| 3,175,196 | 3/1965 | Lee, Jr. et al. | 219/121 |
| 3,204,076 | 8/1965 | Browning | 219/70 |
| 3,360,398 | 12/1967 | Caribotti | 219/121 |
| 3,393,289 | 7/1968 | Duhamel et al. | 219/121 |
| 3,317,704 | 5/1967 | Browing | 219/121 |

*Primary Examiner*—J. V. Truhe
*Assistant Examiner*—Lawrence A. Rouse
*Attorneys*—Robert P. Auber and Leonard R. Kohan ABSTRACT: A method for processing materials with laser beams. A laser beam is directed against the object which is to be cut, welded or joined. A generated stream of air is directed over the object so that cooling air passes over the immediate area or location at which the laser beam strikes. The combination of the directed laser beam and the air stream is such that the cut or welded joint is left free from scorching or surface deformation due to overheating and burning.

*INVENTOR.*
FRANK HORNOR FRY
BY
*Leonard R. Kohan*
ATTORNEY

AIR-COOLED LASER PROCESSING OF MATERIALS

BACKGROUND OF THE INVENTION

In the art of processing plastic materials, particularly of the thermoplastic type, with laser beams, heretofore, vaporization of the immediate plastic surface adjoining the laser beam resulted in scorching effects. Thus, localized heating of the surface being processed by the beam has produced, in the past, vaporization of the material, and this has left a pitted and scorched surface upon the finished product. In some cases discoloration is due to carbon deposited from a reducing or oxygen deficient flame. Actual ignition of the material in proximity of the laser beam has additionally contributed to the destruction of the appearance of the material surface. It has been found that control is required over the generation and propagation of heat in the immediate vicinity of the laser beam. This scorching is also evident in laser processing of paper.

Accordingly, it is an object of the present invention to provide a method by which material can be processed through cutting welding, drilling or joining, without leaving any scorched effects.

It is a specific object of the present invention to achieve the aforementioned results in a simple and economical manner.

It is a further object of the present invention to provide a method of the aforementioned character without interfering with the functional operation of the laser beam used to process the material.

Yet another object of the present invention is to provide a method for utilizing a laser beam to work materials.

Numerous other objects and advantages of the invention will be apparent as it is better understood from the following description, which, taken in connection with the accompanying drawings, discloses a preferred embodiment thereof.

SUMMARY OF THE INVENTION

A method by which materials are processed with laser beams without leaving a scorched or burned surface on the processed product. A laser beam of the nitrogen-carbon dioxide type is used for cutting, drilling, welding and seaming materials through this application of localized heating. A stream or current of fluid such as air is generated by a suitable source and directed onto the work being processed by the laser beam. The velocity imparted to the moving air current or stream is such that the operational characteristics of the laser beam remain unaffected, while the surface of the workpiece in immediate proximity of the laser beam is left in an unscorched and unburned condition.

DESCRIPTION OF THE PREFERRED EMBODIMENT

Figure 1:
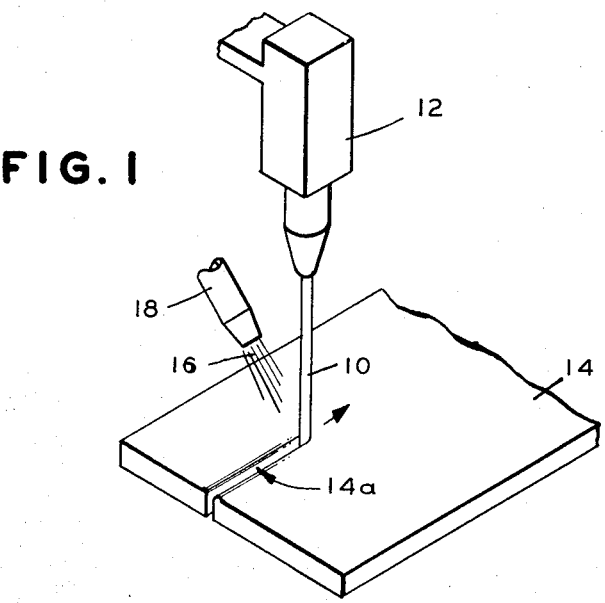
FIG. 1 is a functional operational diagram of the process of the present invention when cutting plastic sheet material.

Referring to the drawing and in particular to FIG. 1, a laser beam 10 is generated by a laser beam generator 12 which may be of the pulsed type or the continuous wave type. The laser beam 10 is directed against the workpiece 14 for the purpose of producing a cut 14a in the workpiece. As a result of the high heat intensity of the laser beam 10, the cut 14a is readily produced by moving the generator 12 and hence the beam 10 along the desired path. Thus, for example by applying controlled motion to the generator 12, any desired configuration may be cut into the workpiece 14. This result, moreover, may be accomplished by retaining the generator 12 stationary and deflecting mirrors (not shown) suitable for this purpose. At the same time, other optical devices known in the art may be used to deflect the laser beam 10 in a controlled manner so as to cut a predetermined configuration into the workpiece 14. The cutting operation can also be accomplished with the laser beam stationary and motion applied to the workpiece.

To prevent scorching of the surface of the workpiece along the sides of the cut 14a, a stream of fluid 16 such as air is generated from a suitable source 18. The air stream or air current 16 is directed onto the workpiece 14 and specifically onto the area of intersection of the laser beam and the workpiece. The airstream 16 is generated such that all or a portion of it covers the surface of the workpiece 14 being processed. Thus, the cross-sectional area of the airstream is made sufficiently large so as to cover the entire area of the workpiece upon which a configuration is to be cut by the laser beam 10. At the same time, it is possible to generate an air stream of substantially smaller cross-sectional area, and to move the air stream so as to follow the motion of the laser beam during the cutting operation, and thereby provide a cooling effect in the immediate vicinity of the intersection of the laser beam with the workpiece. The velocity of the air stream or air current is regulated to assure that no interfering effects are produced in the operation of the laser beam. Specifically, the velocity of the air passing the local area at which the laser beam 10 strikes the workpiece 14, is such that no effects are applied directly to the laser beam. From the viewpoint of the laser beam, therefore, its operation remains unaltered with the presence of the air stream 16.

Figure 2:
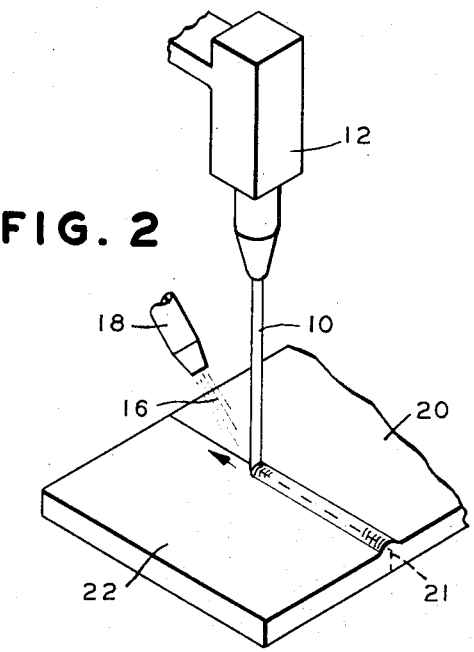
FIG. 2 is a functional operational diagram of the process of the present invention for butt-welding plastic materials.

This same arrangement may be applied to the method in which a laser beam is used to weld together plastic materials, as illustrated in FIG. 2. As shown in this diagram, two separate workpieces 20 and 22 are joined together along an edge 21 through a butt weld. The laser beam 10 is directed so that localized heating of the edges of the workpieces to be joined, results in fusion of the two materials to produce a solid butt joint along the edge 21 shown as a broken line. The source 18, in this method of welding, also directs the stream of air 16 over the workpieces 20 and 22 so that sufficient cooling results in a scorchless surface, and the butt weld is in the form of a neat seam.

Figure 3:
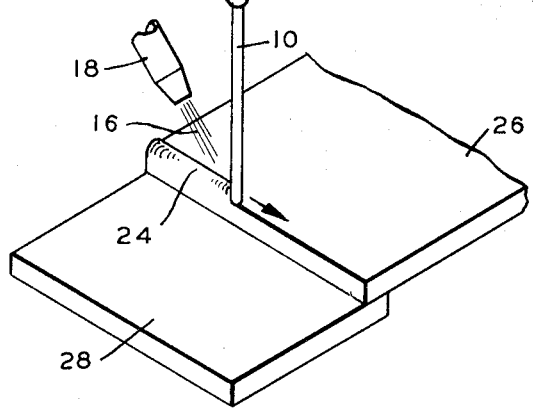
FIG. 3 is a functional operational diagram, and shows lap welding and seaming of plastic materials with a laser beam, in accordance with the present invention.

In the method of FIG. 3 a laser beam 10 is used to join two sheets or plates of plastic material through a lap joint. In this method of joining the lasser beam is passed along the path 24 and generates sufficient heat through the sheets or plates 26 and 28 so as to join these two overlapping materials along the line or path 24. Depending upon the character of the laser beam, the path 24 may have a wider or narrower width. To produce a finished product which will have a surface pleasant in appearance, a stream of cooling air is also utilized in this embodiment. The cooling effects of the air, so as to prevent a scorched surface where the laser beam strikes and passes through the workpieces, are similar to those described above in relation to FIGS. 1 and 2.

It is thought that the invention and many of its attending advantages will be understood from the foregoing description and it will be apparent that changes may be made in the steps of the method described and their order of accomplishment without departing from the spirit and scope of the invention or sacrificing all of its material advantages, the form hereinbefore described being merely a preferred embodiment thereof.

I claim:

1. In a method for the laser processing of a scorchable material, which includes the step of directing a laser beam of energy against the surface of the material to be processed, causing a portion of the material to be removed as vaporized material where the laser beam impinges against the surface thereof, the vaporized material being flammable at the temperature of the laser beam, the improvement which comprises the step of:

directing a moving current of a gas where the laser beam impinges against the surface of the material to substantially blow the vaporized material away from the laser beam to inhibit ignition by the laser beam of the vaporized material, so as to prevent the scorching of the surface of the material.

2. The method for laser processing of materials as defined in claim 1 wherein said materials are plastics.

3. The method for laser processing of materials as defined in claim 1 including the steps of moving said beam and said gas current along a predetermined path;

and cutting said material means by said laser beam along said path.

4. The method for laser processing of materials as defined in claim 1 including the steps of moving said laser beam and said gas current along a predetermined path;

and welding said materials along said predetermined path.

5. The method for laser processing of materials as defined in claim 1 including the steps of moving said laser beam and said gas current along a predetermined path;

and joining said materials along said predetermined path.

6. The method for laser processing of materials as defined in claim 1 including the step of drilling an opening through at least a portion of said material means by said laser beam.

7. The method for laser processing of materials as defined in claim 1 wherein said gaseous means comprises air.

8. The method for laser processing of materials as defined in claim 1 including the step of controlling the velocity of said moving current of gaseous means for cooling said intersection without interfering with the operational characteristics of said laser beam by said moving current of gaseous means.

* * * * *